(12) United States Patent
Bender et al.

(10) Patent No.: US 8,561,083 B2
(45) Date of Patent: *Oct. 15, 2013

(54) APPLICATION ASSOCIATING BASED ON CRYPTOGRAPHIC IDENTIFICATION

(75) Inventors: Christopher L. Bender, Tavistock (CA); Andrew Robert Turi, Guelph (CA)

(73) Assignee: Blackberry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,217

(22) Filed: Apr. 4, 2012

(65) Prior Publication Data

US 2012/0198474 A1  Aug. 2, 2012

Related U.S. Application Data

(63) Continuation of application No. 11/865,373, filed on Oct. 1, 2007, now Pat. No. 8,166,487.

(51) Int. Cl.
*G06F 9/44* (2006.01)
*G06F 21/20* (2006.01)

(52) U.S. Cl.
USPC .......................................... 719/313; 713/182

(58) Field of Classification Search
USPC .......................................... 719/313; 713/182
See application file for complete search history.

(56) References Cited

U.S. PATENT DOCUMENTS

| | | | |
|---|---|---|---|
| 5,781,633 A * | 7/1998 | Tribble et al. | 713/167 |
| 5,852,666 A * | 12/1998 | Miller et al. | 713/167 |
| 5,960,087 A * | 9/1999 | Tribble et al. | 713/167 |
| 6,049,838 A * | 4/2000 | Miller et al. | 719/315 |
| 7,181,620 B1 | 2/2007 | Hur | |
| 7,404,080 B2 | 7/2008 | Jakobsson | |
| 7,848,518 B2 | 12/2010 | Hars | |
| 8,166,487 B2 | 4/2012 | Bender et al. | |
| 2004/0199763 A1 | 10/2004 | Freund | |

(Continued)

FOREIGN PATENT DOCUMENTS

| | | |
|---|---|---|
| CA | 2640198 | 4/2009 |
| EP | 1225513 | 7/2002 |
| EP | 2045753 | 4/2009 |
| WO | 2005079469 | 9/2005 |

OTHER PUBLICATIONS

Examination Report. European Patent Application No. 0711683.8. Dated: Mar. 22, 2011.

(Continued)

*Primary Examiner* — Van Nguyen
(74) *Attorney, Agent, or Firm* — Bereskin & Parr LLP/S.E.N.C.R.L., S.r.l.

(57) ABSTRACT

As each application is loaded for use by an operating system, a message handling application within the operating system associates the applications with relativity metrics for later use in handling interprocess messages. A cryptographic identifier associated with each application is verified and, based on the verifying, each application is associated with a relativity metric. The message handling application receives a message from an origin process. The message handling application then determines a destination process for the message, a relativity metric for the origin process, and a relativity metric for the destination process. Based on an analysis of the relativity metrics of the origin process and the destination process, the message handling application determines whether to forward the message to the destination process.

25 Claims, 9 Drawing Sheets (56) References Cited

U.S. PATENT DOCUMENTS

2005/0278790 A1 12/2005 Birk et al.
2007/0094260 A1 4/2007 Murphy et al.
2007/0226798 A1 9/2007 Sibert
2009/0089796 A1 4/2009 Bender et al.

OTHER PUBLICATIONS

Office Action. Canadian Patent Application No. 2,640,198. Dated: Aug. 30, 2010.

Office Action. Canadian Patent Application No. 2,640,198. Dated: Aug. 8, 2011.

EPO Communication pursuant to Article 94(3) EPC relating to application No. 07117683.8 dated Apr. 22, 2010.

The Windows Vista and Windows Server 2008 Developer Story: Windows Vista Application Development Requirements for User Account Control (UAC), Windows Vista Technical Articles, Sep. 2006, Microsoft Corporation, retrieved at http://download.microsoft.com/download/D/9/B/D9BEB875-BC1D-4338-A655-251F4F353B2E/Top10Wave.exe.

Extended European Search Report issued on Mar. 17, 2008 in connection with corresponding European Application No. EP07117683.8.

Response. European Application No. 07117683.8. Dated: Aug. 7, 2009.

Response. European Application No. 07117683.8. Dated: Aug. 23, 2010.

Response. European Application No. 07117683.8. Dated: Sep. 13, 2011.

* cited by examiner

APPLICATION ASSOCIATING BASED ON CRYPTOGRAPHIC IDENTIFICATION

CROSS-REFERENCE TO RELATED APPLICATION

This application is a continuation of U.S. patent application Ser. No. 11/865,373, filed Oct. 1, 2007 and issued to patent as U.S. Pat. No. 8,166,487. The entire contents of U.S. patent application Ser. No. 11/865,373 is hereby incorporated by reference.

FIELD OF THE INVENTION

The present application relates generally to applications executed on a processor and, more specifically, to associating applications with relativity metrics based on cryptographic identification.

BACKGROUND OF THE INVENTION

"Message passing" generally refers to a form of communication used in concurrent computing, parallel computing, object-oriented programming and interprocess communication. Communication is accomplished by the sending of messages to recipients. Forms of messages include function invocations, signals and data packets. Message-passing-model-based programming languages typically define messaging as the (usually asynchronous) sending (usually by copy) of a data item to a communication endpoint (actor, process, thread, socket, etc.). Messages are also commonly used in the same sense as a means of interprocess communication; the other common technique of interprocess communication being streams or pipes, in which data are sent as a sequence of elementary data items instead.

In consideration of message passing for interprocess communication, a message from an origin process to a destination process typically passes, first, to the operating system supporting the execution of the origin process and the destination process. The operating system then handles the passing of the message to the destination process. In some instances, execution of the origin process and the destination process is supported by a virtual machine, where execution of the virtual machine is supported by the operating system. An example virtual machine is the well-known Java™ virtual machine, i.e., the Java™ Runtime Environment. Where a virtual machine is interposed between the processes and the operating system, a message from the origin process is first received by the virtual machine and passed by the virtual machine to the operating system. The operating system then handles the passing of the message to the destination process via the virtual machine.

It would be desirable to improve the manner in which messages are handled by the operating system.

BRIEF DESCRIPTION OF THE DRAWINGS

Reference will now be made to the drawings, which show by way of example, embodiments of the invention, and in which.

DETAILED DESCRIPTION OF THE EMBODIMENTS

Modern operating systems handle the passing of messages from one process to one or more other processes. The message can take the form of a targeted message, which has a single destination process, or can take the form of a global message, which has multiple destination processes (e.g., all processes).

In an example scheme, a manufacturer of a computing product that is a mobile communication and computing device provides an operating system to facilitate operation of the product. The manufacturer includes, in the product, proprietary applications that are designed to be executed on the operating system. Furthermore, the manufacturer makes available details about the workings of the operating system, thereby allowing third parties to develop applications that are also designed to executed on the operating system. Such workings of the operating system may include, for instance, Application Programming Interfaces (APIs).

To facilitate third party application development, the manufacturer can arrange the product so that the operating system executes a known virtual machine. Consequently, third parties develop applications that are executed by the virtual machine.

When both the proprietary applications and the third party applications are executed on the same operating system on the same device, the operating system handles the passing of messages from processes based on the third party applications to processes based on the proprietary applications. Additionally, the operating system handles the passing of messages from processes based on the proprietary applications to processes based on the third party applications. This message exchange availability opens numerous attack vectors for a nefarious third party application. For example, a nefarious third party application can send messages to proprietary applications, which messages may modify system state.

Where the operating system has defined application groupings, each process may be associated with a grouping and each grouping may be associated with a relativity metric. A message handling function of the operating system will forward a message from an origin process associated with a grouping "x" to a destination process associated with a grouping "y" so long as the message handling function has previously been determined that, based on the relativity metric of grouping x and the relativity metric of grouping y, messages from processes from grouping x are to be forwarded to processes from grouping y.

According to one aspect described herein, there is provided a method of associating applications with relativity metrics for later use in handling interprocess messages. The method includes receiving a first executable file for a first application, the first executable file including a first cryptographic identifier, verifying the first cryptographic identifier and associating, based on the verifying, the first application with a first relativity metric. In other aspects of the present application, an apparatus is provided for carrying out this method and a computer readable medium is provided for adapting a processor to carry out this method.

According to another aspect described herein, there is provided a method of associating applications with relativity metrics and handling interprocess messages. The method includes receiving a first executable file for a first application, the first executable file including a first cryptographic identifier, verifying the first cryptographic identifier, where the verifying involves use of a first public cryptographic key, where the first public cryptographic key is associated with a first relativity metric, and associating, based on the verifying, the first application with the first relativity metric. The method further includes receiving a second executable file for a second application, the second executable file including a second cryptographic identifier, verifying the second cryptographic identifier, where the verifying the second cryptographic identifier involves use of a second public cryptographic key, where the second public cryptographic key is associated with a second relativity metric, and associating, based on the verifying the second cryptographic identifier, the second application with the second relativity metric. The method also includes receiving a message from an origin process, the origin process associated with the first application, determining a destination process for the message, the destination process associated with the second application, determining that the first relativity metric is associated with the origin process and determining that the second relativity metric is associated with the destination process. The method also includes analyzing whether, based on the first relativity metric and the second relativity metric, messages from the origin process are allowed to be passed to the destination process and passing the message to the destination process only if allowed based on the analyzing. In another aspect of the present application, an apparatus is provided for carrying out this method.

Other aspects and features of the present invention will become apparent to those of ordinary skill in the art upon review of the following description of specific embodiments of the invention in conjunction with the accompanying figures.

Figure 1:
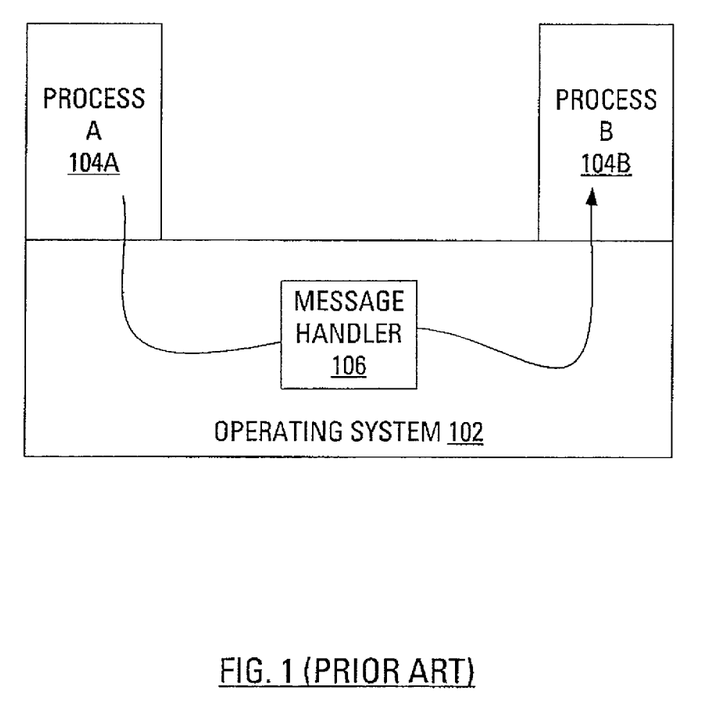
FIG. 1 schematically illustrates interprocess message passing between two processes, where execution of the two processes is supported by an operating system.

FIG. 1 illustrates interprocess message passing in a schematic, simplified form. In particular, the schematic diagram of FIG. 1 includes a representation of an operating system 102. The operating system 102 supports the execution of two processes: a process A 104A; and a process B 104B. The schematic diagram of FIG. 1 also illustrates a message handler 106, as an element of the operating system 102, and a path of a message passing from an origin process, process A 104A, to a destination process, process B 104B.

Figure 2:
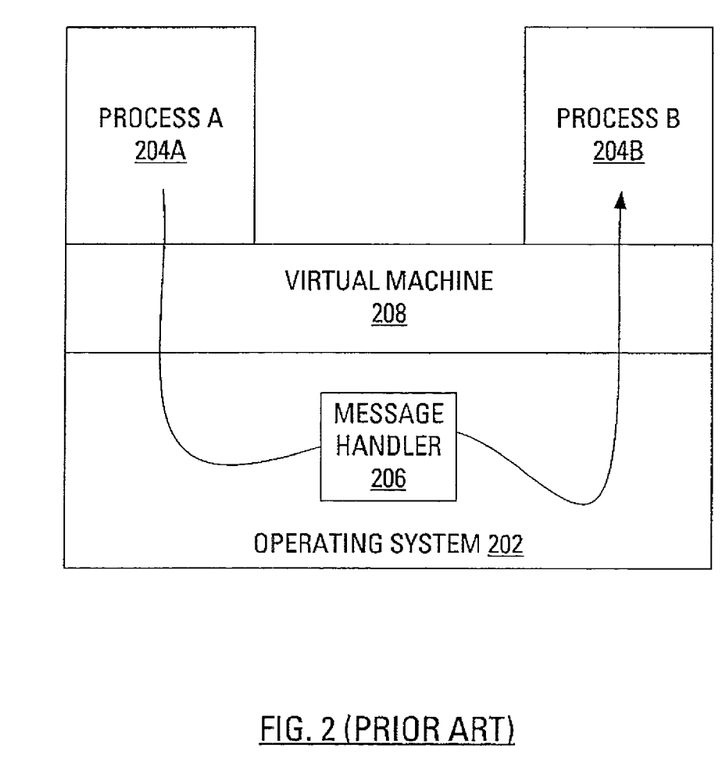
FIG. 2 schematically illustrates interprocess message passing between two processes, where execution of the two processes is supported by a virtual machine, where execution of the virtual machine is supported by an operating system.

FIG. 2 illustrates interprocess message passing in a form similar to that used in FIG. 1. In particular, the schematic diagram of FIG. 2 includes a representation of an operating system 202. The operating system 202 supports the execution of a virtual machine 208. The virtual machine 208 supports the execution of two processes: a process A 204A; and a process B 204B. The schematic diagram of FIG. 2 also illustrates a message handler 206, as an element of the operating system 202, and a path of a message passing from an origin process, process A 204A, to a destination process, process B 204B.

Figure 3:
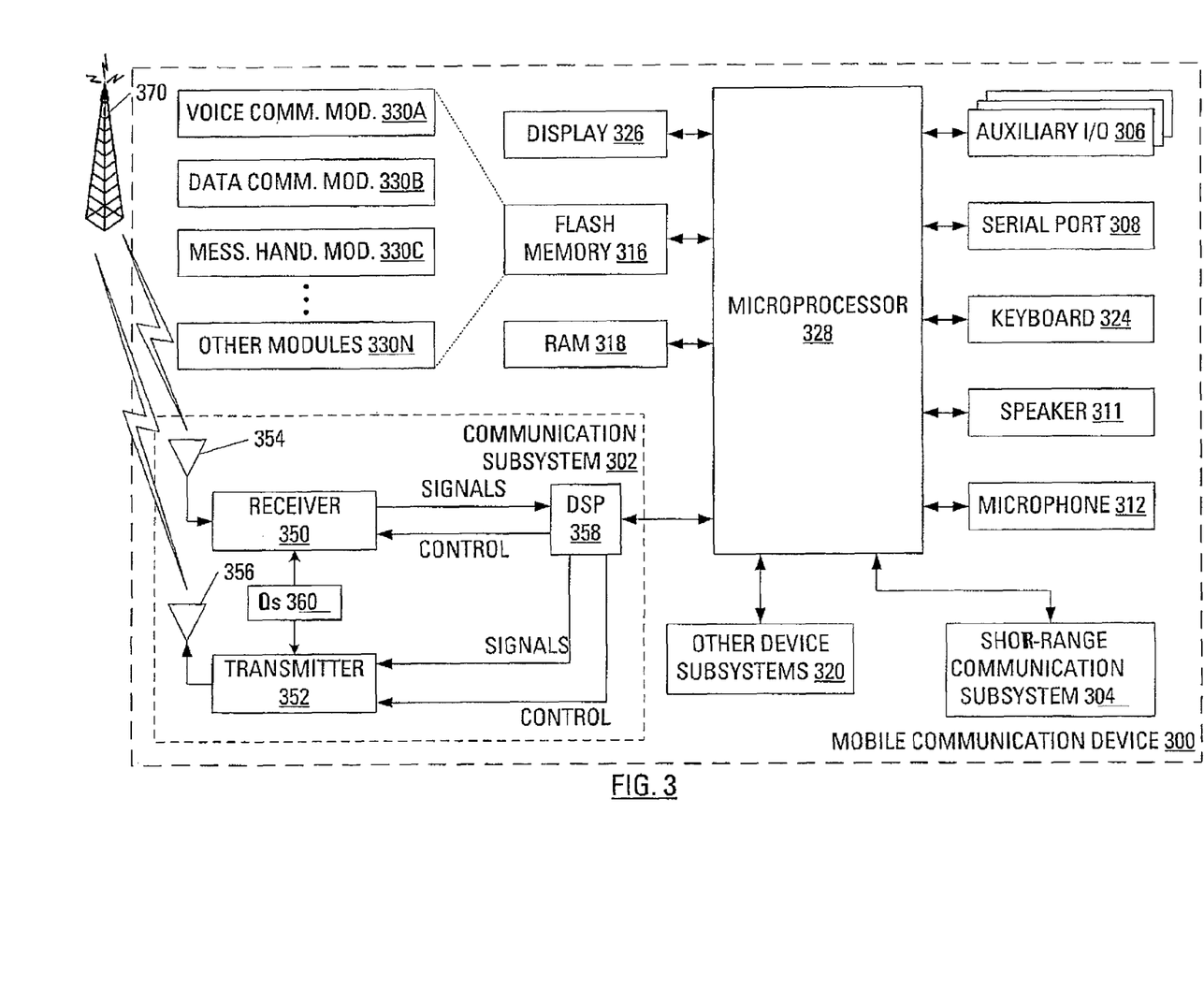
FIG. 3 illustrates a block diagram of a mobile communication device as an example of a device that may carry out a novel method of message passing as presented herein.

FIG. 3 illustrates a mobile communication device 300 as an example of a device that may carry out a novel method of message passing as presented herein. The mobile communication device 300 includes a housing, an input device (e.g., a keyboard 324 having a plurality of keys which may be implemented as a physical keyboard or implemented as a soft keyboard using a touch screen) and an output device (e.g., a display 326), which may be a full graphic, or full color, Liquid Crystal Display (LCD). Other types of output devices may alternatively be utilized. A processing device (a microprocessor 328) is shown schematically in FIG. 3 as coupled between the keyboard 324 and the display 326. The microprocessor 328 controls the operation of the display 326, as well as the overall operation of the mobile communication device 300, in part, responsive to actuation of the keys on the keyboard 324 by a user.

The housing may be elongated vertically, or may take on other sizes and shapes (including clamshell housing structures). Where the keyboard 324 includes keys that are associated with at least one alphabetic character and at least one numeric character, the keyboard 324 may include a mode selection key, or other hardware or software, for switching between alphabetic entry and numeric entry.

In addition to the microprocessor 328, other parts of the mobile communication device 300 are shown schematically in FIG. 3. These include: a communications subsystem 302; a short-range communications subsystem 304; the keyboard 324 and the display 326, along with other input/output devices including a set of auxiliary I/O devices 306, a serial port 308, a speaker 310 and a microphone 312; as well as memory devices including a flash memory 316 and a Random Access Memory (RAM) 318; and various other device subsystems 320. The mobile communication device 300 may be a two-way radio frequency (RF) communication device having voice and data communication capabilities. In addition, the mobile communication device 300 may have the capability to communicate with other computer systems via the Internet.

Operating system software executed by the microprocessor 328 may be stored in a computer readable medium, such as the flash memory 316, but may be stored in other types of memory devices, such as a read only memory (ROM) or similar storage element. In addition, system software, specific device applications, or parts thereof, may be temporarily loaded into a volatile store, such as the RAM 318. Communication signals received by the mobile device may also be stored to the RAM 318.

The microprocessor 328, in addition to its operating system functions, enables execution of software applications on the mobile communication device 300. A predetermined set of software applications that control basic device operations, such as a voice communications module 330A and a data communications module 330B, may be installed on the mobile communication device 300 during manufacture. A message handling module 330C may also be installed on the mobile communication device 300 during manufacture, to implement aspects of the present application. As well, additional software modules, illustrated as an other software module 330N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 370 represented by a radio tower. The data items managed by the PIM application may be seamlessly integrated, synchronized and updated via the wireless carrier network 370 with the device user's corresponding data items stored or associated with a host computer system.

Communication functions, including data and voice communications, are performed through the communication subsystem 302 and, possibly, through the short-range communications subsystem 304. The communication subsystem 302 includes a receiver 350, a transmitter 352 and one or more antennas, illustrated as a receive antenna 354 and a transmit antenna 356. In addition, the communication subsystem 302 also includes a processing module, such as a digital signal processor (DSP) 358, and local oscillators (LOs) 360. The specific design and implementation of the communication subsystem 302 is dependent upon the communication network in which the mobile communication device 300 is intended to operate. For example, the communication subsystem 302 of the mobile communication device 300 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), etc. Other types of data and voice networks, both separate and integrated, may also be utilized with the mobile communication device 300.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 300 may send and receive communication signals over the wireless carrier network 370. Signals received from the wireless carrier network 370 by the receive antenna 354 are routed to the receiver 350, which provides for signal amplification, frequency down conversion, filtering, channel selection, etc., and may also provide analog to digital conversion. Analog-to-digital conversion of the received signal allows the DSP 358 to perform more complex communication functions, such as demodulation and decoding. In a similar manner, signals to be transmitted to the wireless carrier network 370 are processed (e.g., modulated and encoded) by the DSP 358 and are then provided to the transmitter 352 for digital to analog conversion, frequency up conversion, filtering, amplification and transmission to the wireless carrier network 370 (or networks) via the transmit antenna 356.

In addition to processing communication signals, the DSP 358 provides for control of the receiver 350 and the transmitter 352. For example, gains applied to communication signals in the receiver 350 and the transmitter 352 may be adaptively controlled through automatic gain control algorithms implemented in the DSP 358.

In a data communication mode, a received signal, such as a text message or web page download, is processed by the communication subsystem 302 and is input to the microprocessor 328. The received signal is then further processed by the microprocessor 328 for output to the display 326, or alternatively to some auxiliary I/O devices 306. A device user may also compose data items, such as e-mail messages, using the keyboard 324 and/or some other auxiliary I/O device 306, such as a touchpad, a rocker switch, a thumb-wheel, a trackball, a touchscreen, or some other type of input device. The composed data items may then be transmitted over the wireless carrier network 370 via the communication subsystem 302.

In a voice communication mode, overall operation of the device is substantially similar to the data communication mode, except that received signals are output to a speaker 310, and signals for transmission are generated by a microphone 312. Alternative voice or audio I/O subsystems, such as a voice message recording subsystem, may also be implemented on the mobile communication device 300. In addition, the display 326 may also be utilized in voice communication mode, for example, to display the identity of a calling party, the duration of a voice call, or other voice call related information.

The short-range communications subsystem 304 enables communication between the mobile communication device 300 and other proximate systems or devices, which need not necessarily be similar devices. For example, the short-range communications subsystem may include an infrared device and associated circuits and components, or a Bluetooth™ communication module to provide for communication with similarly-enabled systems and devices.

In overview, as each application is loaded for use by an operating system, a message handling application within the operating system associates the applications with relativity metrics for later use in handling interprocess messages. A cryptographic identifier associated with each application is verified and, based on the verifying, each application is associated with a relativity metric. A message handling application of an operating system analyses relativity metrics associated with origin and destination processes for a given message and determines, based on the analysis, whether to pass the given message to the destination process.

Figure 4:
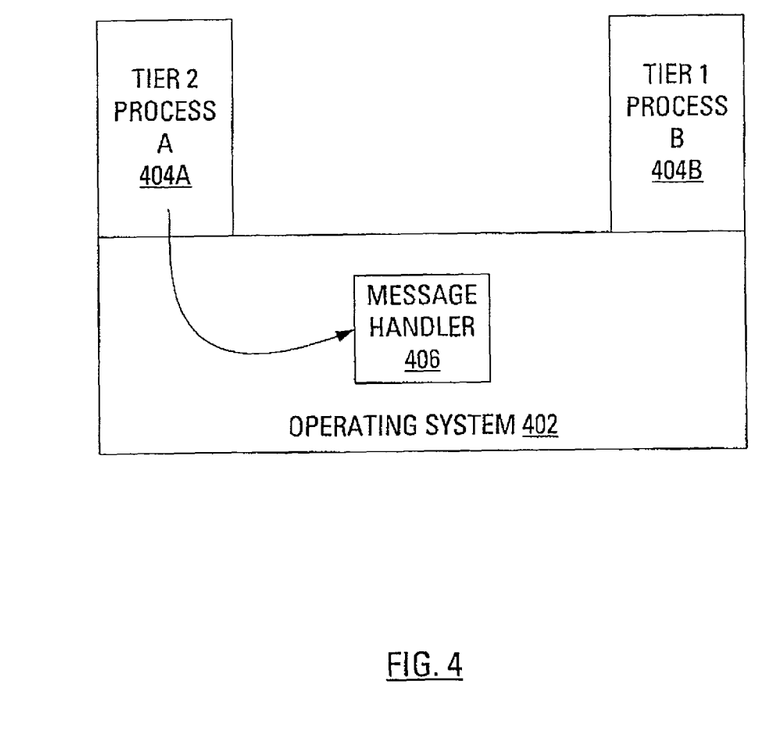
FIG. 4 schematically illustrates handling, by a message handler, of interprocess message passing between two processes, where execution of the two processes is supported by an operating system.

In view of FIG. 4, an operating system 402, more particularly, a message handler 406, has access to predefined application groupings. As the operating system 402 loads a given application file into a memory (such as the flash memory 316 or the RAM 318) for execution by the microprocessor 328 that executes the operating system 402, the operating system 402 associates the given application, in a relativity-metric correlation record accessible by the message handler 406, with one of the predefined application groupings. Consequently, upon execution of a process associated with the given application, the process is also associated with the predefined application grouping.

Each predefined application grouping may be associated with a relativity metric. In one embodiment, the relativity metrics may be defined as tiers, which may be said to be representative of "privilege". A process may be considered to have a higher privilege when associated with a comparatively lower valued tier than a tier with which another process is associated. For example, a process A 404A in FIG. 4 is associated with a Tier "2" while a process B 404B is associated with a Tier "1". Accordingly, the process B 404B has a higher privilege than the process A 404A.

The message handler 406 of the operating system 402 may be configured to only forward messages to destination processes with equal or higher tier values, i.e., equal or lower privilege. The message handler 406 will forward a message from an origin process associated with a grouping "x" to a destination process associated with a grouping "y" so long as it has previously been determined that, based on the relativity metric of grouping x and the relativity metric of grouping y, messages from processes from grouping x are to be forwarded to processes from grouping y.

Figure 5:
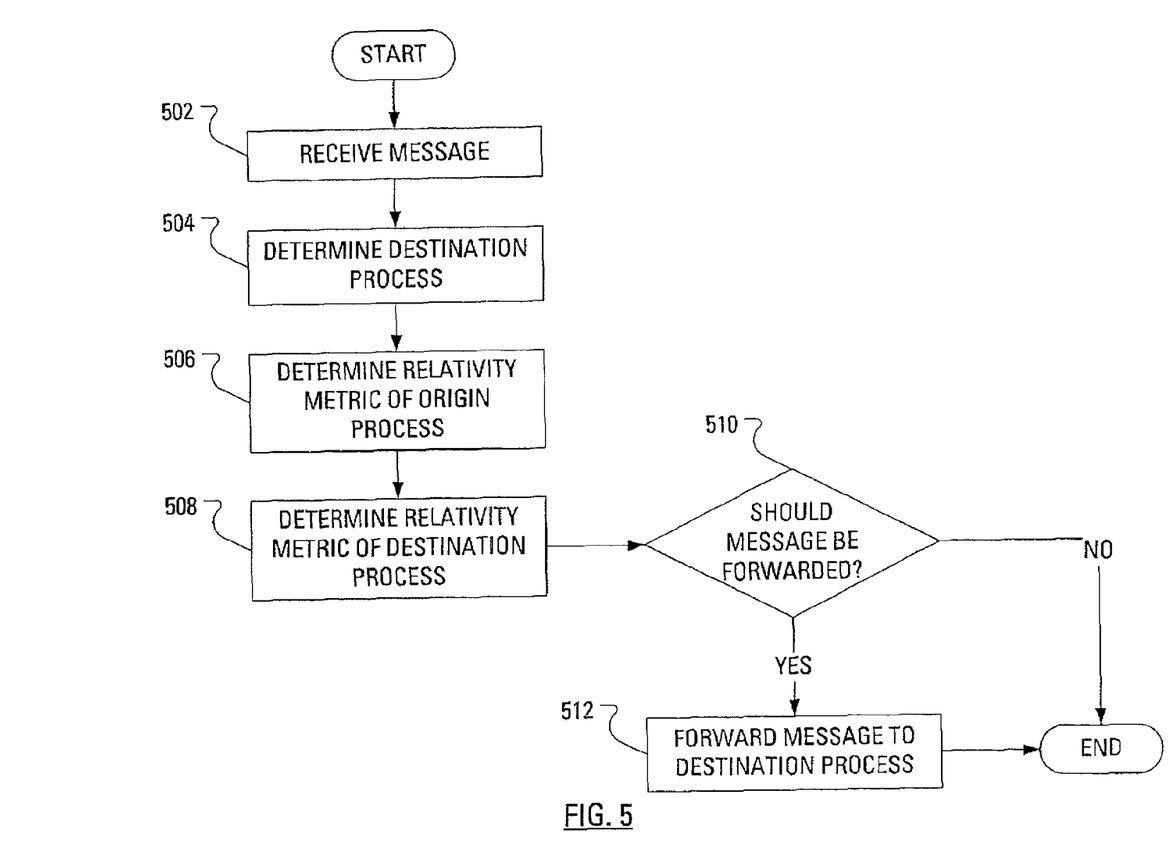
FIG. 5 illustrates example steps in a method of handling message passing in an operating system.

In the example of FIG. 4, the process A 404A has transmitted a message with the process B 404B as the destination process. The message handler 406 may execute a message handling method, example steps of which are illustrated in FIG. 5. Initially, the message handler 406 receives (step 502) the message from the origin process (the process A 404A). The message handler 406 then determines (step 504) that the process B 404B is the destination process for the message. The message handler 406 determines (step 506) a relativity metric of the process A 404A. That is, the message handler 406 determines (step 506) that the process A 404A is associated with a tier with a value of "2". The message handler 406 determines (step 508) a relativity metric of the process B 404B. That is, the message handler 406 determines (step 508) that the process B 404B is associated with a tier with a value of "1". The message handler 406 analyzes (step 510) whether, based on the tier value (2) of the process A 404A and the tier value (1) of the process B 404B, messages from the process A 404A are to be forwarded to the process B 404B. Since the tier value of the process A 404A is lower than the tier value of the process B 404B, the message handler 406 does not forward the message to the process B 404B and the method is complete.

Notably, in the case wherein the process B 404B has transmitted a message with the process A 404A as the destination process, when the message handler 406 analyzes (step 510) the relativity metrics, the message handler 406 determines that the tier value of the process B 404B (the origin process) is higher than the tier value of the process A 404A. Accordingly, the message handler 406 forwards the message to the process A 404A and the method is complete.

So that the message handler 406 may determine the relativity metric of a given process (steps 506, 508), a relativity-metric correlation record may be maintained with a correlation between processes and relativity metrics. Accordingly, determining the relativity metric of a given process (steps 506, 508) may involve the message handler 406 performing a table lookup in the relativity-metric correlation record, with a process identification as a key.

Alternatively, the relativity-metric correlation record may merely maintain a correlation between applications and relativity metrics. It is anticipated that the application with which a given process is associated will be known by the message handler 406. In this case determining the relativity metric of a given process (steps 506, 508) may involve the message handler 406 determining the application with which the given process is associated and then performing a table lookup in the relativity-metric correlation record, with an application identification as a key.

Population of the relativity-metric correlation record may be accomplished by the message handler 406 as each application is loaded. It is known that loading an application can involve providing a computer readable file, e.g., an ".exe" file or, in the Java™ context, a ".jar" file. In other contexts, a computer readable file containing an executable application is referred to as a ".cod" file. It is also known that such files typically include both compiled, executable code and variable declarations.

It is known that executable files for applications can be cryptographically signed so that the applications may not be executed unless the processor that is to execute the application has access to a specific key. For proprietary applications, a manufacturer may provide the message handler 406 with a public cryptographic key and maintain a private cryptographic key as a trade secret. Subsequently, the manufacturer can sign all proprietary applications with the private key. By selecting the correct public key, the message handler 406 may verify the cryptographic identifier on a given proprietary application and associate the given proprietary application with a privileged relativity metric.

For third parties, the manufacturer may provide a second public key to the message handler 406 and a second private key to the third party application developers. Subsequently, the third party application developers can sign all third party applications with the second private key. By selecting the second public key, the product may verify the cryptographic identifier on a given third party application and associate the given third party application with a relativity metric less privileged than the relativity metric associated with the proprietary applications.

Cryptographically signing an application may involve, first, providing the application code as input to a hash function to obtain a digital signature. Subsequently, the digital signature may be encoded using the private key provided by the manufacturer. The encoded digital signature, which may be called a cryptographic signature or identifier ("ID"), may then be appended to the application file.

Figure 6:
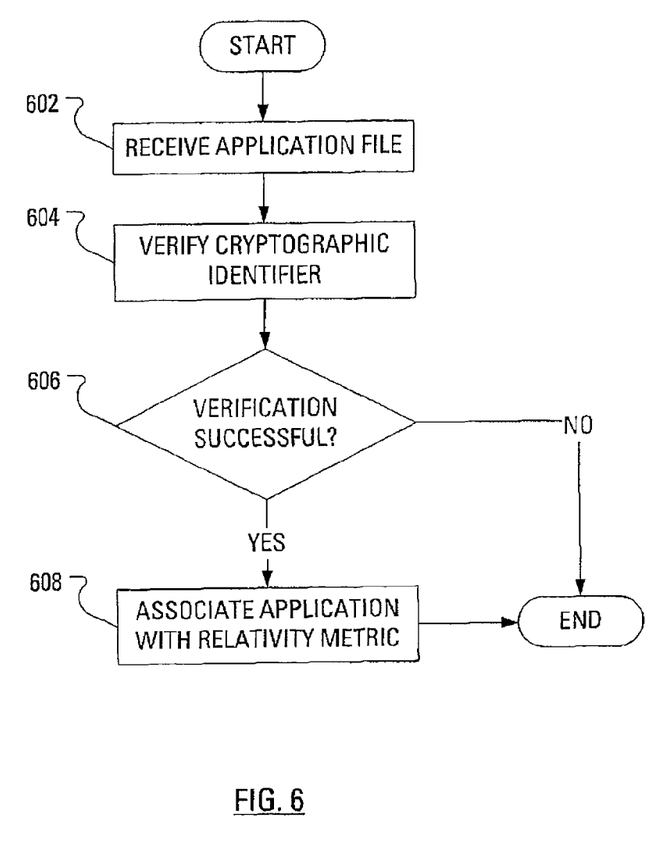
FIG. 6 illustrates example steps in a method of associating applications with relativity metrics.
Figure 7:
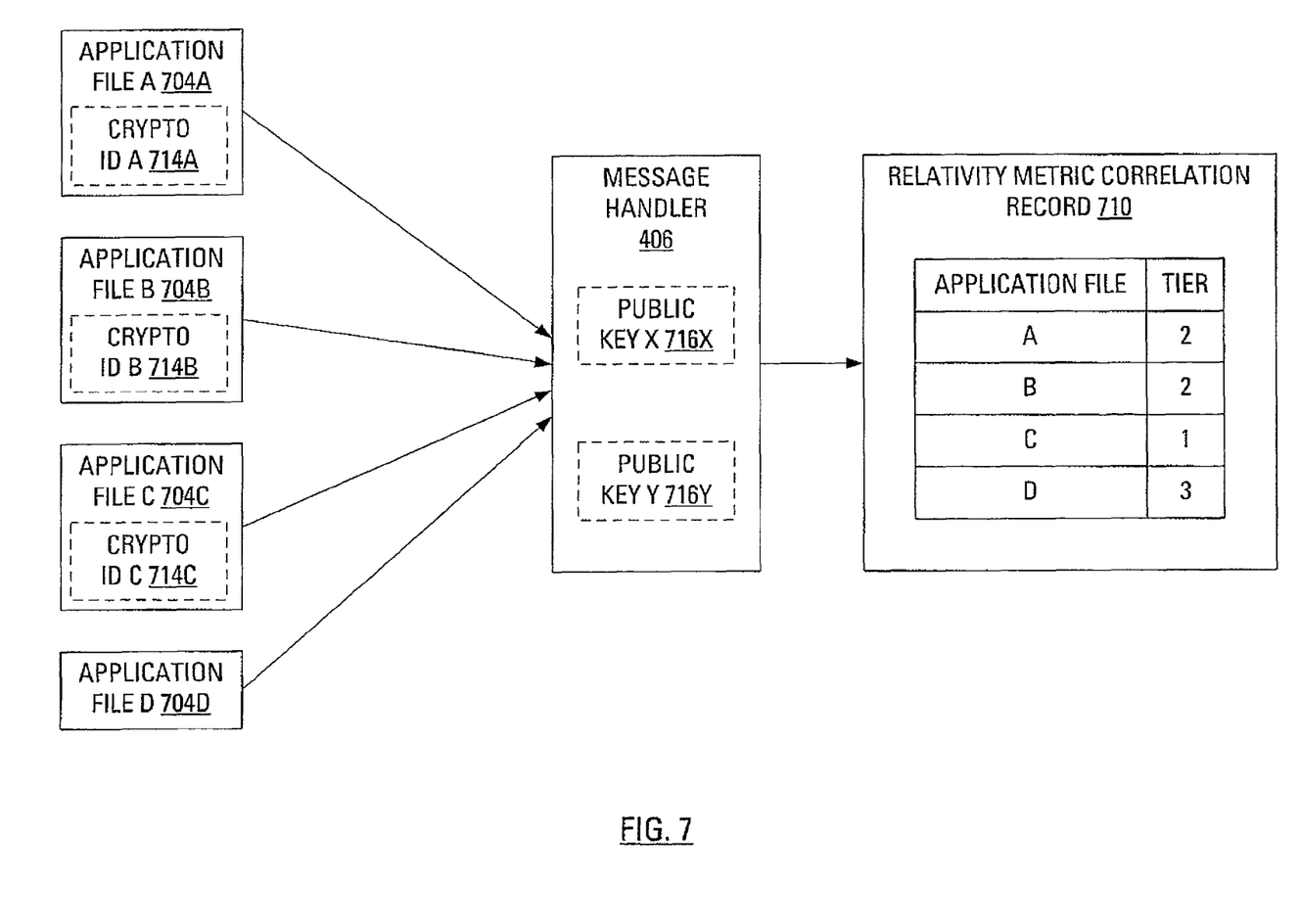
FIG. 7 schematically illustrates associating, by a message handler, of applications with relativity metrics.

Loading and sorting applications may be considered in view of FIG. 6 and FIG. 7. Steps of an example method of loading and sorting applications are illustrated in FIG. 6 as beginning with the message handler 406 receiving (step 602) an application file, for example, an application file A 704A is illustrated in FIG. 7. More particularly, the application file A 704A is illustrated as including a cryptographic ID A 714A. The message handler 406 then acts to verify (step 604) the cryptographic ID A 714A associated with the application file A 704A.

To verify the cryptographic ID A 714A, the message handler 406 may provide the application code as input to the same hash function used by the third party. As a result of providing the application code to the hash function, the message handler 406 obtains a local digital signature. The message handler 406 also decodes the cryptographic ID A 714A using a locally-stored public key (e.g., a public key X 716X, FIG. 7) to obtain a test digital signature. In an example case, the public key X 716X is associated with a Tier "2".

The message handler 406 then determines (step 606) whether the verification has been successful. In particular, if the message handler 406 determines that the local digital signature and the test digital signature are equivalent, then the cryptographic ID A 714A associated with the application file A 704A is considered to have been verified. However, if the message handler 406 determines that the local digital signature and the test digital signature are not equivalent, then the verification is considered to have been unsuccessful.

Where the verification is considered to have been successful, the message handler 406 associates (step 608) the application with a relativity metric. As illustrated in FIG. 7, the application A whose executable code is in the application file A 704A is associated in a relativity metric correlation record 710 with Tier "2". As mentioned above, the public key X 716X is associated with Tier 2 and, since the cryptographic ID A 714A was successfully verified using the public key X 716X, then the application A associated with the application file A 704A is associated with Tier "2".

Subsequently, as an application file B 704B is loaded, the message handler 406 may execute the method of FIG. 6. If a cryptographic ID B 714B, which is associated with the application file B 704B, is successfully verified using the public key X 716X, then the message handler 406 may associate an application B, whose executable code is in the application file B 704B, in the relativity metric correlation record 710 with Tier "2".

Similarly, as an application file C 704C is loaded, the message handler 406 may execute the method of FIG. 6. Assume that a cryptographic ID C 714C, which is associated with the application file C 704C, is successfully verified using a public key Y 716Y. Assume also that the public key Y 716Y is associated with a Tier "1". Accordingly, the message handler 406 may associate an application C, whose executable code is in the application file C 704C, in the relativity metric correlation record 710 with Tier "1".

Similarly, as an application file D 704D is loaded, the message handler 406 may execute the method of FIG. 6. Assume that the application file D 704D is not associated with a cryptographic ID. It may be that a lack of a cryptographic ID is associated with a Tier "3". Accordingly, the message handler 406 may associate an application D, whose executable code is in the application file D 704D, in the relativity metric correlation record 710 with Tier "3".

Where cryptographic signing of application files has been used in the past, the cryptographic signature has been used to identify those applications that are to be allowed to access certain APIs in the operating system 402. As proposed herein, various processes associated with signed applications may continue to access certain APIs, such as those associated with message passing, but as discussed herein, a given message may not be passed to the intended destination, based on determinations made by the message handler 406.

Figure 8:
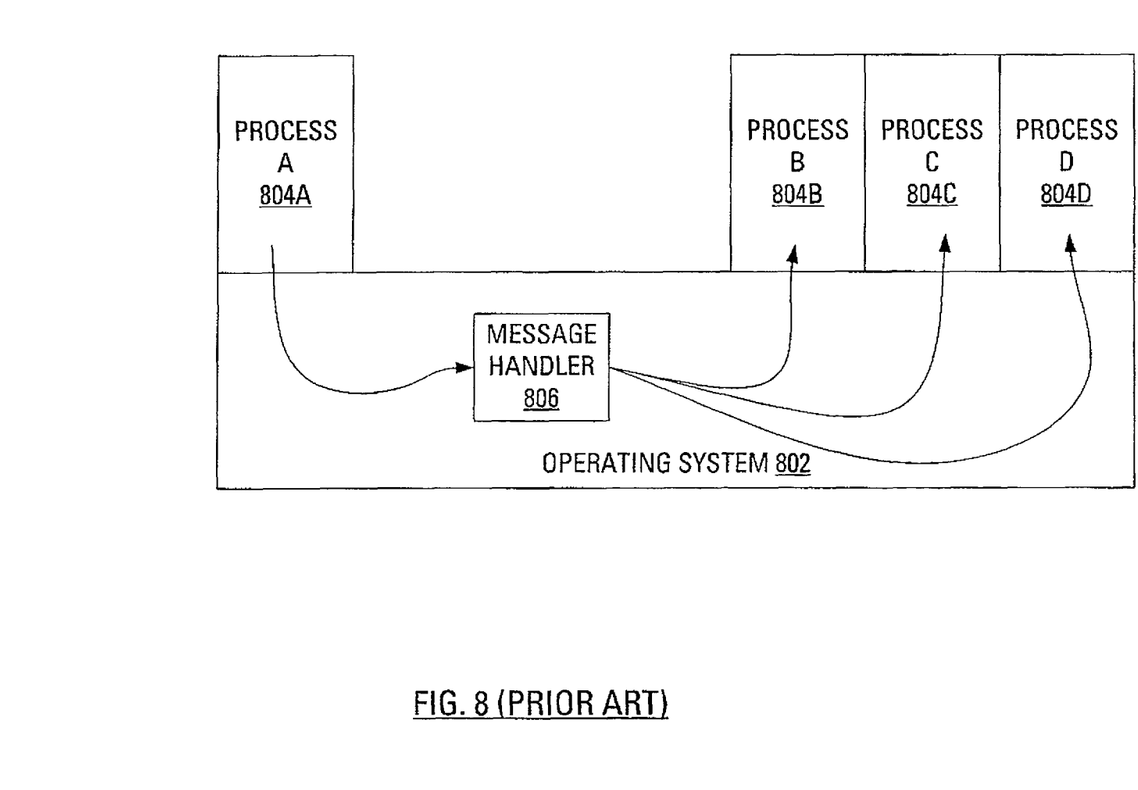
FIG. 8 schematically illustrates handling, by a message handler, of global interprocess message passing between an origin process and three destination processes, where execution of the origin process and the three destination processes is supported by an operating system.

FIG. 8 illustrates an example of typical global message handling. In FIG. 8, an operating system 802 supports the execution of a process A 804A, a process B 804B, a process C 804C and a process D 804D. Additionally, the operating system 802 includes a message handler 806. In one scenario, the process A 804A sends a global message. The message handler 806 receives the global message and distributes a copy to each of the process B 804B, the process C 804C and the process D 804D.

Figure 9:
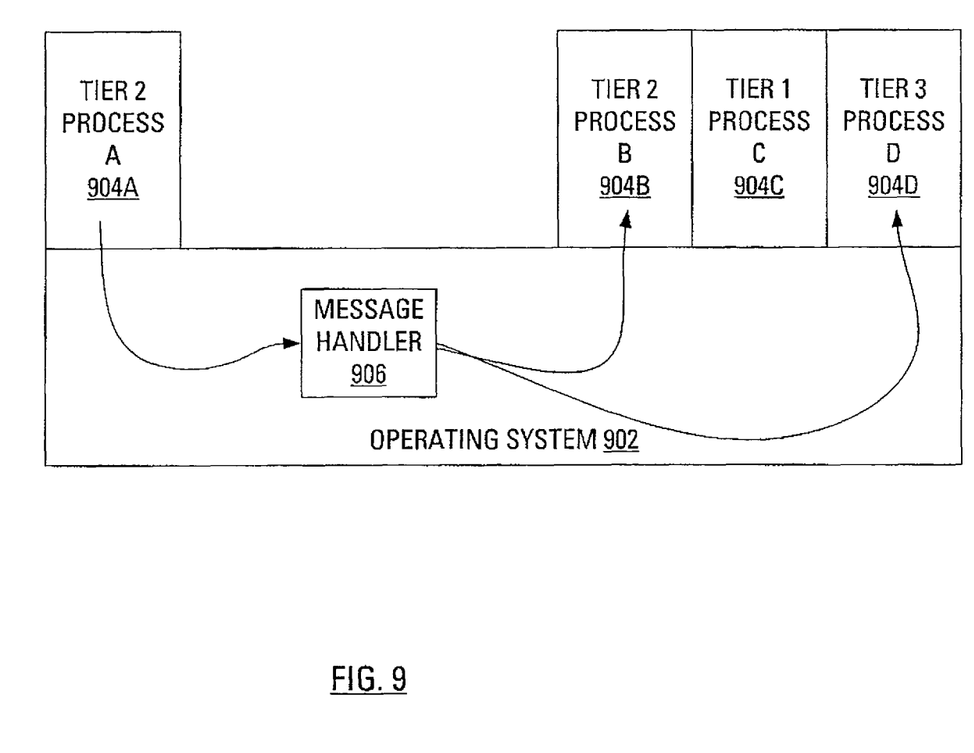
FIG. 9 schematically illustrates handling, by a message handler, of global interprocess message passing between an origin process and multiple destination processes, where execution of the origin process and the multiple destination processes is supported by an operating system, where the processes are associated with different privilege levels.

FIG. 9 illustrates an example of global message handling filtered according to an aspect of the present disclosure. In FIG. 9, an operating system 902 supports the execution of a tier 2 process A 904A, a tier 2 process B 904B, a tier 1 process C 904C and a tier 3 process D 904D. Additionally, the operating system 902 includes a message handler 906. In one scenario, the process A 904A sends a global message. The message handler 906 receives the global message and, in view of each of the potential destination processes, may execute the method as shown and described in connection with FIG. 5.

In consideration of the tier 2 process B 904B as a destination, the message handler 906 determines (step 510) that the origin and destination processes are in the same tier and forwards the message to the tier 2 process B 904B.

In consideration of the tier 1 process C 904C as a destination, the message handler 906 determines (step 510) that the destination process has a higher privilege than the origin process and completes the method without forwarding the message to the tier 1 process C 904C.

In consideration of the tier 3 process D 904D as a destination, the message handler 906 determines (step 510) that the origin process has a higher privilege than the destination process and forwards the message to the tier 3 process D 904D.

Notably, the relativity metrics need not distinguish processes in a hierarchical manner. Instead, the relativity metrics may distinguish processes by way of sets. Such sets may defined such that: a message handler passes messages from processes of a first set to processes of a second set, but not to processes of a third set; the message handler passes messages from processes of the second set to processes of the third set, but not to processes of the first set; and the message handler passes messages from processes of the third set to processes of the first set, but not to processes of the second set.

Conveniently, aspects of the present application allow for binding permissions to applications automatically and at the time that the applications are loaded, where the permissions are based on cryptographic identifiers associated with the applications. In contrast, some known systems bind permissions to a given application manually (by an administrator) and handle message passing from the given application to another application based on disparity between permission levels associated with the account associated with the given application and the account associated with the other application.

Furthermore, aspects of the present application establish a scheme though which proprietary processes, execution of which is supported on an operating system, may be relieved from receiving messages from process related to lesser privileged applications that are also executing on the same operating system.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of associating applications with relativity metrics for later use in handling interprocess messages, wherein acts of the method are executed by a processor of a device, the method comprising:
    receiving a first executable file for a first application;
    if the first executable file comprises a first cryptographic identifier, verifying the first cryptographic identifier using a first cryptographic key;
    if the first cryptographic identifier is successfully verified, associating, based on the verifying the first cryptographic identifier, the first application with a first relativity metric, wherein the first cryptographic key used to verify the first cryptographic identifier is associated with the first relativity metric;
    receiving a second executable file for a second application;
    if the second executable file comprises a second cryptographic identifier, verifying the second cryptographic identifier using a second cryptographic key;
    if the second cryptographic identifier is successfully verified, associating, based on the verifying the second cryptographic identifier, the second application with a second relativity metric, wherein the second cryptographic key used to verify the second cryptographic identifier is associated with the second relativity metric;

receiving a message from an origin process, the origin process associated with the first application, wherein an operating system supports execution of the first application on the device;

determining a destination process for the message, the destination process associated with the second application, wherein the operating system supports execution of the second application on the device;

determining that the first relativity metric is associated with the origin process and with a first application grouping;

determining that the second relativity metric is associated with the destination process and with a second application grouping; and passing the message to the destination process if messages are allowed to pass from applications associated with the first application grouping to applications associated with the second application grouping.

2. The method of claim 1, further comprising not passing the message to the destination process if messages are not allowed to pass from applications associated with the first application grouping to applications associated with the second application grouping.

3. The method of claim 1, wherein the determining that the first relativity metric is associated with the origin process comprises:
   determining that the origin process is associated with the first application; and
   determining that the first application is associated with the first relativity metric.

4. The method of claim 1, wherein the determining that the first relativity metric is associated with the first application grouping comprises:
   determining that the first relativity metric is associated with the first application; and
   determining that the first application is associated with the first application grouping.

5. The method of claim 1, further comprising:
   if the first executable file lacks the first cryptographic identifier, associating the first application with the first relativity metric, wherein a lack of the first cryptographic identifier is associated with the first relativity metric.

6. The method of claim 1, further comprising:
   if the second executable file lacks the second cryptographic identifier, associating the second application with the second relativity metric, wherein a lack of the second cryptographic identifier is associated with the second relativity metric.

7. The method of claim 1, wherein the first cryptographic key and the second cryptographic key comprise public keys.

8. The method of claim 1, wherein the message comprises at least one of a function invocation, a signal, or a data packet.

9. A device comprising:
   a processor configured to:
      receive a first executable file for a first application;
      if the first executable file comprises a first cryptographic identifier, verify the first cryptographic identifier using a first cryptographic key;
      if the first cryptographic identifier is successfully verified, associate, based on a verification of the first cryptographic identifier, the first application with a first relativity metric, wherein the first cryptographic key used to verify the first cryptographic identifier is associated with the first relativity metric;
      receive a second executable file for a second application;
      if the second executable file comprises a second cryptographic identifier, verify the second cryptographic identifier using a second cryptographic key;
      if the second cryptographic identifier is successfully verified, associate, based on a verification of the second cryptographic identifier, the second application with a second relativity metric, wherein the second cryptographic key used to verify the second cryptographic identifier is associated with the second relativity metric;
      receive a message from an origin process, the origin process associated with the first application, wherein an operating system supports execution of the first application on the device;
      determine a destination process for the message, the destination process associated with the second application, wherein the operating system supports execution of the second application on the device;
      determine that the first relativity metric is associated with the origin process and with a first application grouping;
      determine that the second relativity metric is associated with the destination process and with a second application grouping; and
      pass the message to the destination process if messages are allowed to pass from applications associated with the first application grouping to applications associated with the second application grouping.

10. The device of claim 9, wherein the processor is configured to not pass the message to the destination process if messages are not allowed to pass from applications associated with the first application grouping to applications associated with the second application grouping.

11. The device of claim 9, wherein the processor is configured to determine that the first relativity metric is associated with the origin process by:
    determining that the origin process is associated with the first application; and
    determining that the first application is associated with the first relativity metric.

12. The device of claim 9, wherein the processor is configured to determine that the first relativity metric is associated with the first application grouping by:
    determining that the first relativity metric is associated with the first application; and
    determining that the first application is associated with the first application grouping.

13. The device of claim 9, wherein the processor is further configured to, if the first executable file lacks the first cryptographic identifier, associate the first application with the first relativity metric, wherein a lack of the first cryptographic identifier is associated with the first relativity metric.

14. The device of claim 9, wherein the processor is further configured to, if the second executable file lacks the second cryptographic identifier, associate the second application with the second relativity metric, wherein a lack of the second cryptographic identifier is associated with the second relativity metric.

15. The device of claim 9, wherein the first cryptographic key and the second cryptographic key comprise public keys.

16. The device of claim 9, wherein the device comprises a mobile device.

17. The device of claim 9, wherein the message comprises at least one of a function invocation, a signal, or a data packet.

18. A non-transitory computer readable medium containing computer-executable instructions that, when performed by a processor of a device, cause the processor to:

receive a first executable file for a first application;

if the first executable file comprises a first cryptographic identifier, verify the first cryptographic identifier using a first cryptographic key;

if the first cryptographic identifier is successfully verified, associate, based on a verification of the first cryptographic identifier, the first application with a first relativity metric, wherein the first cryptographic key used to verify the first cryptographic identifier is associated with the first relativity metric;

receive a second executable file for a second application;

if the second executable file comprises a second cryptographic identifier, verify the second cryptographic identifier using a second cryptographic key;

if the second cryptographic identifier is successfully verified, associate, based on a verification of the second cryptographic identifier, the second application with a second relativity metric, wherein the second cryptographic key used to verify the second cryptographic identifier is associated with the second relativity metric;

receive a message from an origin process, the origin process associated with the first application, wherein an operating system supports execution of the first application on the device;

determine a destination process for the message, the destination process associated with the second application, wherein the operating system supports execution of the second application on the device;

determine that the first relativity metric is associated with the origin process;

determine that the second relativity metric is associated with the destination process;

associate processes identified by the first relativity metric with a first set of processes and associate processes identified by the second relativity metric with a second set of processes; and pass the message to the destination process if messages are allowed to pass from processes of the first set to processes of the second set.

19. The medium of claim 18, wherein the instructions further cause the processor to not pass the message to the destination process if messages are not allowed to pass from applications associated with the first application grouping to applications associated with the second application grouping.

20. The medium of claim 18, wherein the instructions cause the processor to determine that the first relativity metric is associated with the origin process by:
 determining that the origin process is associated with the first application; and
 determining that the first application is associated with the first relativity metric.

21. The medium of claim 18, wherein the instructions cause the processor to determine that the first relativity metric is associated with the first application grouping by:
 determining that the first relativity metric is associated with the first application; and
 determining that the first application is associated with the first application grouping.

22. The medium of claim 18, wherein the instructions further cause the processor to, if the first executable file lacks the first cryptographic identifier, associate the first application with the first relativity metric, wherein a lack of the first cryptographic identifier is associated with the first relativity metric.

23. The medium of claim 18, wherein the instructions further cause the processor to, if the second executable file lacks the second cryptographic identifier, associate the second application with the second relativity metric, wherein a lack of the second cryptographic identifier is associated with the second relativity metric.

24. The medium of claim 18, wherein the first cryptographic key and the second cryptographic key comprise public keys.

25. The medium of claim 18, wherein the message comprises at least one of a function invocation, a signal, or a data packet.

* * * * *